United States Patent [19]

Miyanaga

[11] Patent Number: 4,809,517
[45] Date of Patent: Mar. 7, 1989

[54] BLOWER CONTROLLING DEVICE FOR AUTOMOBILE AIR-CONDITIONING SYSTEM

[75] Inventor: Choshichi Miyanaga, Higashimatsuyama, Japan

[73] Assignee: Diesel Kiki Co., Ltd., Tokyo, Japan

[21] Appl. No.: 37,515

[22] Filed: Apr. 13, 1987

[30] Foreign Application Priority Data

Apr. 21, 1986 [JP] Japan .................................. 61-60046

[51] Int. Cl.[4] ............................................. F25D 29/00
[52] U.S. Cl. ....................................... 62/163; 165/25; 237/2 A
[58] Field of Search ............... 62/163, 186; 236/91 R, 236/91 F, 1 C; 237/2 A; 338/172; 165/25, 26, 27, 43

[56] References Cited

U.S. PATENT DOCUMENTS 4,442,885 4/1984 Matsuzaki ............................. 62/163

*Primary Examiner*—Henry A. Bennet
*Attorney, Agent, or Firm*—Birch, Stewart, Kolasch & Birch

[57] ABSTRACT

A blower controlling device for an automobile air-conditioning system includes an automatic speed changing controller for controlling the speed of a blower motor during an automatic speed changing mode. The automatic speed changing controller includes a plurality of relays for changing speed of the blower motor, and automatically changes speed of the blower motor by driving the relays based on a thermal load signal from the air-conditioning system. The speed control of the blower motor can be switched from the automatic speed changing control to a manual speed changing controller by a changeover switch. The blower controlling device further include a control device which controls the automatic speed changing controller so that the relays do not operate when the blower motor is switched to the manual speed changing controller. Thereby, the relays are prevented from operating and generating their operating sounds when the air-conditioning system is not in the automatic speed changing mode.

9 Claims, 2 Drawing Sheets

BLOWER CONTROLLING DEVICE FOR AUTOMOBILE AIR-CONDITIONING SYSTEM

BACKGROUND OF THE INVENTION

The present invention relates to a control device of a blower motor in an automobile air-conditioning system.

FIG. 1 shows a prior art blower motor speed control device for an automobile air-conditioning system.

In FIG. 1, reference numeral 1 shows a blower motor. In a power supply circuit of the blower motor 1, a resistor circuit comprises resistors 2, 3 and 4 for speed control. The resistors 2, 3 and 4 provide a variable resistance that can be selected by either an automatic speed changing means including speed changing relays 5, 6 and 7, switching transistors 8, 9 and 10 and comparators 11, 12 and 13, or by a manual speed changing switch 14. The automatic speed changing means and the manual speed changing switch 14 can be selected by switching means comprising a relay 15 and a changeover switch 16. When the changeover switch 16 is switched at a contact (A), a common contact of the manual speed changing switch 14 is grounded, and speed of the blower motor 1 is changed manually by the manual speed changing switch 14. When the changeover switch 16 is switched at a contact (B), the relay 15 is closed, and speed of the blower motor 1 is changed automatically by operation of the speed changing relays 5, 6 and 7. Reference voltages supplied to negative input terminals of the comparators 11, 12 and 13 in the automatic speed changing means are different from each other, their values being reduced in order of the comparators 11, 12 and 13. To positive input terminals of the comparators 11, 12 and 13, a thermal load signal is supplied. The thermal load signal, which is calculated and supplied based on a set room temperature, a detected room temperature, a detected ambient temperature and a detected quantity of solar radiation, represents a quantity of thermal load to be controlled to attain a set temperature in a room. The voltage level of the thermal load signal will rise in accordance with an increase of the thermal load to be controlled. The comparators 11, 12 and 13 supply Low level outputs when the voltage level of the thermal load signal is low, but as the thermal load signal increases, their outputs change to a High level in order of the comparators 11, 12 and 13. The transistors 8, 9 and 10 become conductive in response to the High level outputs of corresponding comparators 11, 12 and 13. The speed changing relays 5, 6 and 7 change from contacts (a) to (b) in response to conduction by corresponding transistors 8, 9 and 10. If the changeover switch 16 is switched to the contact (B), the speed of the blower motor 1 is changed automatically by the operation of the speed changing relays 5, 6 and 7.

In the prior art controlling device composed as above, the relays 5, 6 and 7 are not in their off state under the manual operation mode with the changeover switch 16 switched to the contact (A), therefore, the speed changing relays 5, 6 and 7 operate and generate their operating sound despite the use of the non-automatic speed changing control device. Consequently, the prior art controlling device not only give jarring sounds to a driver and passengers, but also give a misunderstanding to a driver and passengers as if the air conditioner was in the automatic speed changing node.

SUMMARY OF THE INVENTION

An object of the present invention, therefore, is to overcome the disadvantages and limitations of the prior art controlling device by providing a new and improved blower controlling device for a automobile air-conditioning system.

Another object of the present invention is to provide a blower controlling device for an automobile air-conditioning system which can turn speed changing relays off under a manual operation mode.

The above and other objects are attained by a blower controlling device for an automobile air-conditioning system comprising; a resistor circuit, for controlling a motor speed, which is inserted in a power supply circuit of a blower motor; automatic speed changing means, including a plurality of relays for selecting a resistance value of said resistor circuit, for automatically changing a speed of said blower motor by controlling the drive of said relays based on a thermal load signal from the air-conditioning system; manual speed changing means which selects a resistance value of said resistor circuit and manually controls a speed of said blower motor; and switching means for switching between said automatic speed changing means and said manual speed changing means; and further comprising; controlling means, responsive to a switching operation of said switching means, for controlling said automatic speed changing means so that said relays of said automatic speed changing means do not operate when switching is done for said blower motor to be controlled by said manual speed changing means.

BRIEF DESCRIPTION OF THE DRAWINGS

The foregoing and other objects, features and attendant advantages of the present invention will be highly understood as the same become better understood by means of the following description and accompanying drawings wherein.

DETAILED DESCRIPTION OF THE INVENTION

Figure 1:
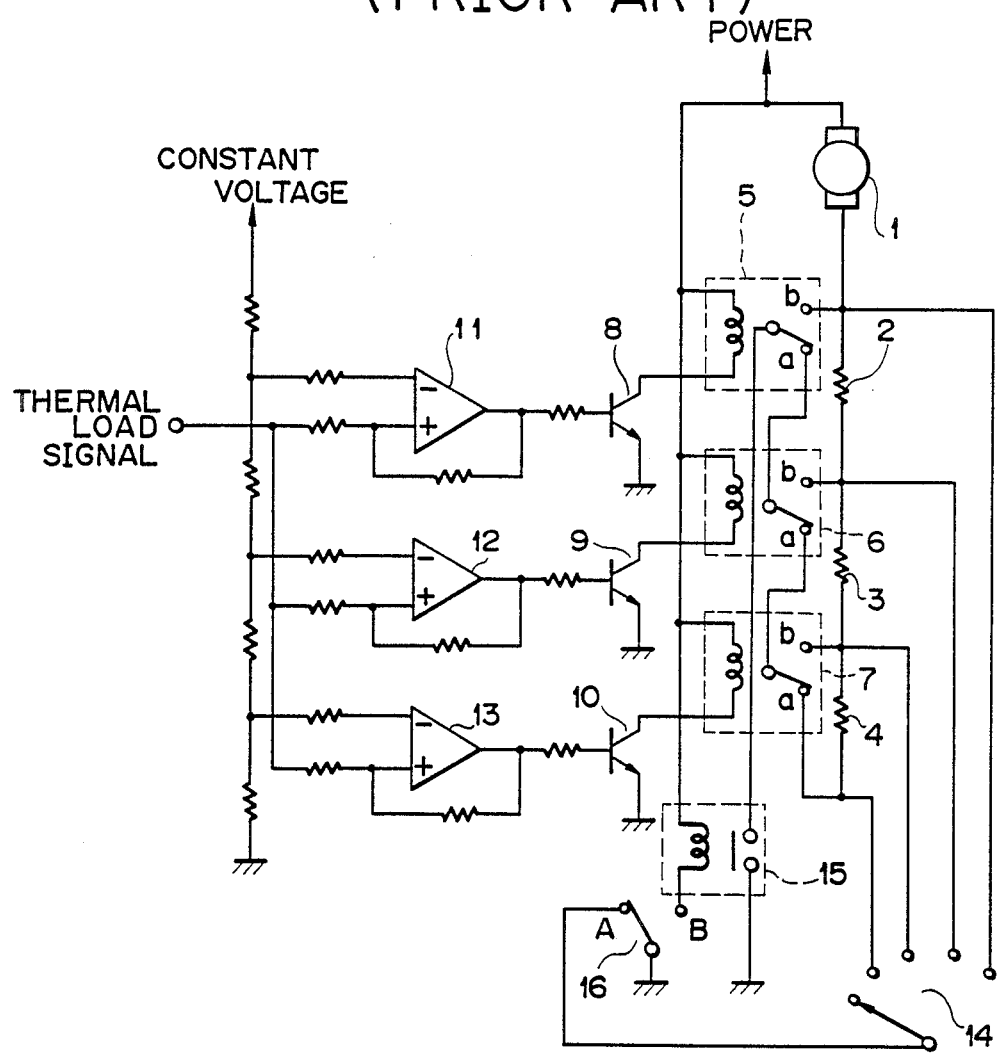
FIG. 1 is a circuit diagram showing a prior art blower controlling device.
Figure 2:
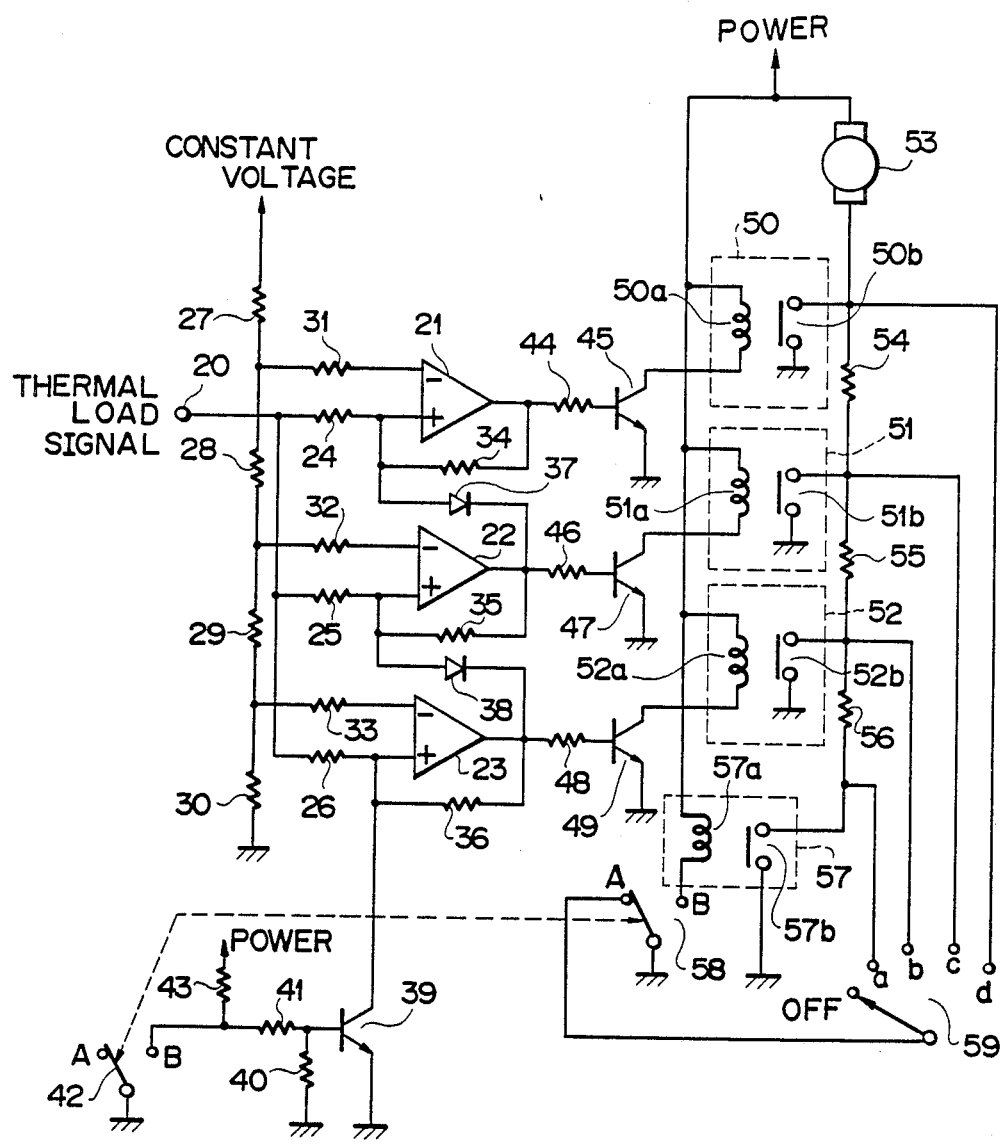
FIG. 2 is a circuit diagram showing an embodiment of a blower controlling device according to the present invention.

In FIG. 2, the reference numeral 20 indicates an input terminal of a thermal load signal. The input terminal 20 is connected via respective resistors 24, 25 and 26 to positive input terminals of comparators 21, 22 and 23. The thermal load signal, as aforementioned in FIG. 1, represents a quantity of thermal load to be controlled in order to attain a set temperature in an automobile room, and an increase of thermal load to be controlled results in the corresponding increase of a voltage level of the thermal load signal. The negative input terminals comparators 21, 22 and 23 are applied with reference voltages, different from each other, via resistors 27, 28, 29 and 30 serially inserted between a constant voltage source and ground. The negative input terminal of the comparator 21 is connected via a resistor 31 between the resistors 27 and 28, the negative input terminal of the comparator 22 is connected via a resistor 32 between the resistors 28 and 29, and the negative input terminal of the comparator 23 is connected via a resistor 33 between the resistors 29 and 30. Therefore, it is obvious that the reference voltages are reduced in order of the comparators 21, 22 and 23. Between the positive input terminal and an output terminal of each comparator 21, 22 and 23, hysteresis resistors 34, 35 and 36 are inserted, respectively. Between the positive input terminal of the comparator 21 and the output terminal of the comparator 22, a diode 37 is inserted so that the anode of the diode is connected to the positive input terminal of the comparator 21 and the cathode of the diode is connected to the output terminal of the comparator 22. Between the positive input terminal of the comparator 22 and the output terminal of the comparator 23, a diode 38 is inserted in the same manner as diode, 37 was inserted above. The positive input terminal of the comparator 23 is connected to a collector of a transistor 39, and the emitter of the transistor is grounded. Via the diodes 37, 38 and the transistor 39, during the on state of the transistor 39, the output levels of the comparators 21, 22 and 23 are maintained at the Low level.

A base of the transistor 39 is grounded via a resistor 40 and also connected via a resistor 41 to a selective contact (B) of a changeover switch 42. Between the resistor 41 and the contact (B) of the changeover switch 42, a power source is applied via a resistor 43. The changeover switch 42 provides a grounded common contact, a selective contact (A) and the abovementioned selective contact (B), and is arranged so that the transistor 39 is conductive when the change over switch is switched to the contact (A), and the transistor 39 is cut off when the changeover switch is switched to the contact (B).

The output terminal of the comparator 21 is connected via a resistor 44 to a base of a transistor 45, the output terminal of the comparator 22 is connected via a resistor 46 to a base of a transistor 47, and the output terminal of the comparator 23 is connected via a resistor 48 to a base of a transistor 49. The emitter of transistor 45 is grounded connected, and its collector is connected to the power source via an exciting coil 50a of a speed changing relay 50. The emitter of transistor 47 is grounded, and its collector is connected to the power source via an exciting coil 51a of a speed changing relay 51. The transistor 49 is grounded with its emitter, and connected with its collector to the power source via an exciting coil 51a of a speed changing relay 52. A normally open contact 50b of the speed changing relay 50 is inserted between one terminal of a blower motor 53 and the ground. The other terminal of the blower motor 53 is connected to the power source. A normally open contact 51b of the speed changing relay 51 is inserted via a resistor 54 between one terminal of blower motor 53 and the ground. A normally open contact 52b of the speed changing relay 52 is inserted via resistors 54 and 55 between one terminal of blower 53 and the ground. Further, to one terminal of the blower motor 53 is connected one end of a normally open contact 57b of a relay 57 via resistors 54, 55 and 56. The other end of the normally open contact 57b is grounded. One end of an exciting coil 57a of the relay 57 is connected to the power source, and its other end is connected to a selective contact (B) of a changeover switch 58. The changeover switch 58 provides a grounded common contact, a selective contact (A) and the above-mentioned selective contact (B), and is arranged so that it interlocks with the aforementioned changeover switch 42.

The contact (A) of the changeover switch 58 is connected to a common contact of a manual speed changing switch 59. The manual speed changing switch 59 provides an OFF contact and four other contacts (a, b, c, d) for speed changing. The contact (a) is connected via resistors 54, 55 and 56 to one terminal of the blower motor 53, the contact (b) is connected via resistors 54 and 55 to one terminal of the blower motor 53, the contact (c) is connected via the resistor 54 to one terminal of the blower motor 53, and the contact (d) is connected to one terminal of the blower motor 53 without any resistor in between.

In the above-mentioned arrangement, if the changeover switch 42 is placed at the contact (A), the interlocking changeover switch 58 is also placed at the contact (A). When the changeover switch 42 is placed at the contact (A), the transistor 39 is in on state, therefore, the outputs of the comparators 21, 22 and 23 are Low level regardless of the thermal load signal level. Consequently, the transistors 45, 47 and 49 are not driven, and the speed changing relays 50, 51 and 52 are not operated. Also, the other changeover switch 58 is placed at the contact (A), causing the relay 57 to open and the common contact of the manual speed changing switch 59 to become grounded at the same time. Therefore, by the switching operation of the manual speed changing switch 59, the changing of speed of the blower motor 53 can be accomplished.

When the changeover switch 42 is switched from the contact (A) to (B), the other changeover switch 58 is also switched from the contact (A) to (B). When the changeover switch 42 switched to the contact (B), the transistor 39 is turned off, and the outputs of the comparators 21, 22 and 23 are released. Also, the other changeover switch 58 is switched to the contact (B), causing the relay 57 to closed, and the common contact of the manual speed changing switch 59 to detach from ground at the same time. By this operation, the automatic speed control of the blower motor 53 is started. Moreover, when the thermal load is small and all comparators 21, 22 and 23 provide Low level outputs, a voltage through the resistors 54, 55 and 56 is applied to the blower motor 53, and as the thermal load increases, a voltage according to the operation of the speed changing relays 50, 51 and 52 corresponding to the High level outputs of the comparators 21, 22 and 23 is applied to the blower motor 53.

As described above in detail, and according to the present invention, since the speed changing relays of automatic speed changing means turn off when the speed change control of the blower motor is switched to manual operation, no operating sound is generated from the speed changing relays during manual operation. Therefore, the blower control device according to the present invention will not cause any jarring sounds to a driver and passengers or give a false signal that the automatic control mode of the air conditioner is being utilized.

From the foregoing it will now be apparent that a new and improved blower controlling device has been devised. It should be understood of course that the embodiment disclosed is merely illustrative and is not intended to limit the scope of the invention. Reference should be made to the appended claims, therefore, rather than the specification as indicating the scope of the invention.

What is claimed is:

1. A blower control device, responsive to a thermal load signal provided by a thermal sensor, for controlling power from a power supply circuit to control speed of a blower motor in a vehicle's air-conditioning system to attain a set temperature comprising;

variable resistive circuit means, operatively connected to the power supply circuit and said blower motor, for controlling the speed of the blower motor;

automatic speed changing means, responsive to the thermal load signal which represents a quantity of thermal load to be controlled, for automatically changing said speed of said blower motor in increments of speed change, said automatic speed changing means including,
comparator means, responsive to said thermal load signal, for comparing a predetermined reference voltage to said thermal load signal and producing a drive signal output, and relay means, responsive to said drive signal output of said comparator means, for selecting a resistance value of said variable resistive circuit means in accordance with said thermal load signal;

manual speed changing means, responsive to manual operation, for selecting a resistance value of said variable resistive circuit means and manually controlling said speed of said blower motor;

switching means, for selectively switching between said automatic speed changing means and said manual speed changing means; and control means, responsive to said switching means for pulling down said drive signal output of said comparator means to almost ground-level, said control means disables said drive signal output of said comparator means to hold said relay means in non-excitation when said switching means is switched to said manual speed changing means;

said control means allowing said manual speed changing means to change said speed of said blower motor in increments of speed change equal to said increments of speed change of said automatic speed changing means.

2. The blower control device as claimed in claim 1 wherein said comparator means of said automatic speed changing means further includes,
a plurality of comparators, each said comparator including,
a negative input terminal responsive to a predetermined reference voltage,
a positive input terminal responsive to said thermal load signal,
an output terminal, responsive to said negative and positive input terminals, for providing said drive signal output, the predetermined reference voltage associated with each of said comparators is different with respect to each of said comparators;
each of said plurality of comparators producing a high level drive signal output when said thermal load signal exceeds its associated predetermined reference voltage.

3. The blower control device as claimed in claim 2 wherein said control means comprises:
a switch means, responsive to said switching means, for providing an electrically conductive path between an output terminal of only one comparator and an electrical ground; and
diode means, operatively connected between the positive input terminal of one comparator and the output terminal of another comparator, for providing an uni-directional electrical path from said positive input terminal of said one comparator to said output terminal of said other comparator.

4. The blower control device as claimed in claim 3 wherein said switch means is a transistor.

5. The blower control device as claimed in claim 1, wherein said switching means comprises:
a first changeover switch for switching between said automatic speed changing means and said manual speed changing means; and
a second changeover switch, interlocked with said first changeover switch, for providing power to enable the operation of said control means when said switching means is switched to said manual speed changing means.

6. The blower control device as claimed in claim 4, wherein said switching means comprises:
a first changeover switch for switching between said automatic speed changing means and said manual speed changing means; and
a second changeover switch, interlocked with said first changeover switch, for providing power to enable said transistor to become conductive, thereby providing said electrical conductive path between said output terminals of said only one comparator and said electrical ground.

7. A control device, responsive to a thermal load signal provided by a thermal sensor, for controlling power from a power supply circuit to control speed of a blower motor of a vehicle's air-conditioning system to control the temperature of the vehicle's interior, comprising:
automatic speed control means, responsive to the thermal load signal which represents a quantity of said temperature to be controlled, for automatically controlling, by using electrical outputs, said speed of said blower motor in increments of speed change;
manual speed control means, responsive to manual operation, for manually controlling said speed of said blower motor;
switching means, for selectively switching enablement between said automatic speed control means and said manual speed control means; and
control means, responsive to said switching means, for electrically disengaging said electrical outputs of said automatic speed control means;
said control means, allows said manual speed control means to change said speed of said blower motor in increments of speed change equal to said increments of said speed change of said automatic speed control means;
said switching means including,
a first changeover switch for switching between said automatic speed control means and said manual speed control means, and
a second changeover switch, interlocked with said first changeover switch, for producing power to enable the operation of said control means when said switching means is switched to said manual speed control means.

8. The control device as claimed in claim 7, wherein said control means comprises:
a switch means, responsive to said switching means, for providing said electrical outputs of said automatic speed control means with an electrical path to ground.

9. The control device as claimed in claim 8, wherein said switch means is a transistor.

* * * * *